Oct. 11, 1932.    G. W. VEALE    1,882,346
AUTOMOBILE HEATER
Filed Aug. 28, 1930
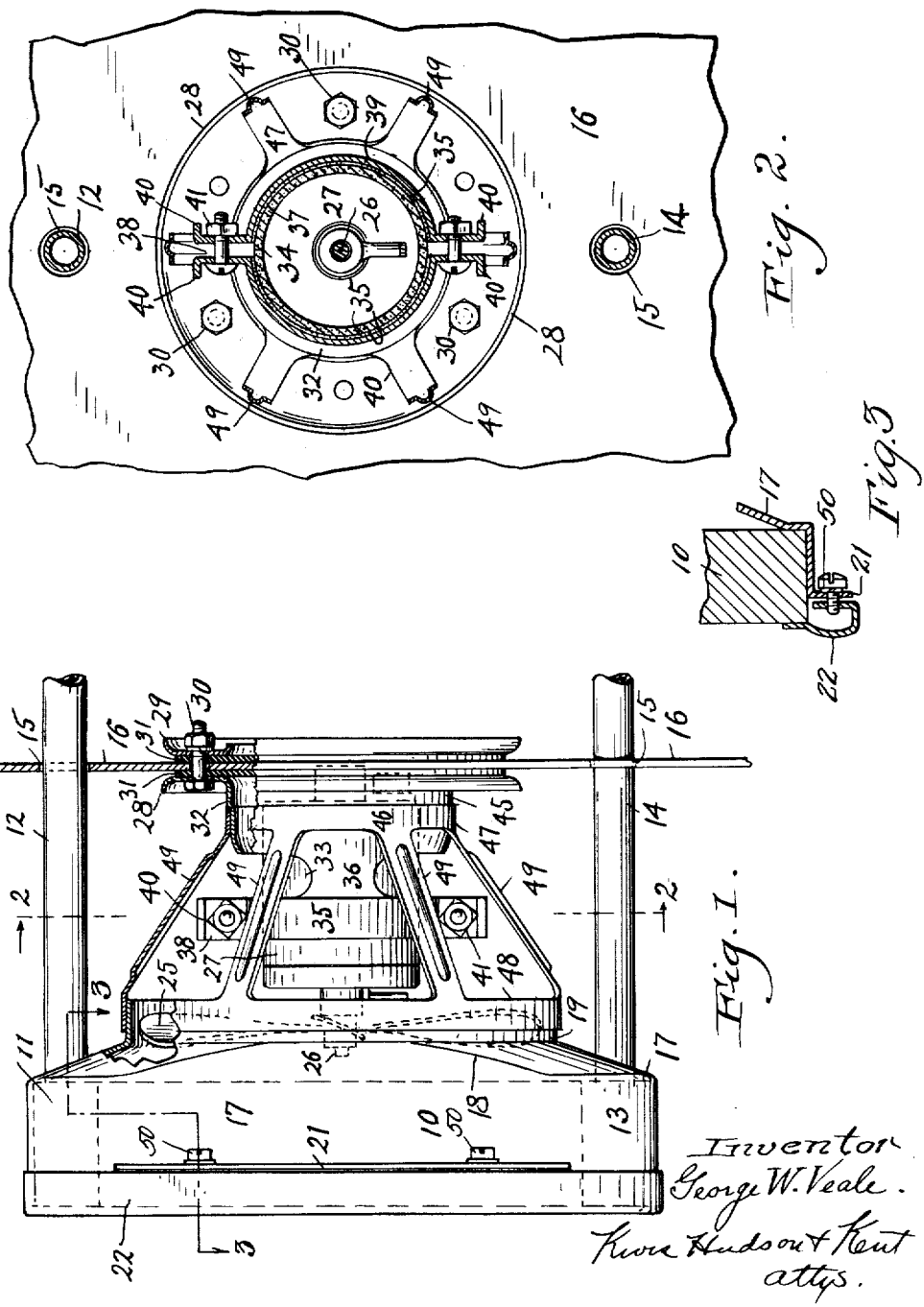
Inventor
George W. Veale.
Krim Hudson + Kent
attys.

Patented Oct. 11, 1932

1,882,346

UNITED STATES PATENT OFFICE

GEORGE W. VEALE, OF CLEVELAND HEIGHTS, OHIO, ASSIGNOR TO THE EATON MANUFACTURING COMPANY, OF CLEVELAND, OHIO, A CORPORATION OF OHIO

AUTOMOBILE HEATER

Application filed August 28, 1930. Serial No. 478,392.

This invention relates to automobile heaters, and more particularly to heaters of the hot water type, for utilizing the heat of the motor cooling water circulating system for heating the passenger compartment of a motor vehicle.

It is an object of the invention to provide an improved form of support for devices of this character that will be simple in design, economical to manufacture and capable of firmly supporting the heater.

Another object is to provide means for supporting the heater or portions thereof from the automobile dash independently of the inlet and outlet pipes for the radiator core.

Other objects and features of novelty will be apparent as the following description proceeds, reference being had to the accompanying drawing, in which Figure 1 is an elevation of a heater according to the preferred embodiment of the present invention, parts being broken away and shown in section; and Fig. 2 is a section taken along the line 2—2 of Fig. 1.

Fig. 3 is a partial section taken along the line 3—3 of Fig. 1.

Referring more particularly to the drawing, the heater comprises a radiator core 10, having at its upper end a tank 11, which receives hot water from the engine water jacket through an inlet pipe 12. The core 10 also includes a lower tank 13, which discharges through an outlet pipe 14. The core 10, intermediate the tanks 11 and 13, may be of any preferred construction which will permit passage of the water from the tank 11 to the tank 13 and at the same time permit transverse flow therethrough of the air to be heated. The pipes 12 and 14 pass through apertures 15 in the automobile dash 16, the apertures 15 being slightly larger than the pipes.

The core is provided with a casing 17, preferably a sheet metal stamping which is flared inwardly, as at 18, and extends to an annular flange 19, the pipes 12 and 14 passing through apertures in the casing. The front of the casing 17 has two side flanges 21, to which the radiator shell 22 may be bolted.

This may be seen by reference to Fig. 3 which shows a partial section through the casing and the shell. When the bolts 50 are tightened, the shell 22 and the casing 17 are drawn together, thereby clamping the core 10 between them. Holes are provided in the back of the casing to permit the inlet and outlet pipes 12 and 14 to project back from the core. The shell and the casing almost completely surround the core and provide a secure mounting for it, and in addition, shield this relatively delicate member from injury. A fan 25 is mounted within the flange 19 and carried by the shaft 26 of a motor 27. It is obvious that rotation of the fan 25 will force air through the radiator core 10 and thus cause a circulation of the air within the driving or passenger compartment.

Means are provided for supporting the core 10 and the motor 27 from the dash 16 independently of the pipes 12 and 14. Accordingly a pair of securing members, preferably rings 28 and 29, are bolted together through the dash 16 as by means of bolts 30. The arrangement is such that the bolts 30 are widely spaced so as to employ a large area of the dash 16 for the desired support. The member 29 may be a flat ring having at its inner and outer edges flanges and provided with a number of bolt holes between the flanges. The member 28 is similar to the member 29, except that the bolt holes therein are a multiple of the number of holes in the ring 29. Inasmuch as the ring 28 is relatively fixed as will be hereinafter described, the provision of the larger number of bolt holes will afford a selection of locations for the bolts 30, while the relatively free ring 29 may be rotated so that the smaller number of holes therein will register with the selected holes in the ring 28. Gaskets 31 are interposed between the rings 28 and 29 and the dash 16.

The inner flange of the ring 29 forms an annular projection 32, which is cut away intermediate its ends as at 33, the inner end thereof being slotted as at 34. This construction is such as to provide a split ring 35 at the inner end of the member 32, the halves of the split ring being connected by arms 36 to the body portion of the member 32. The motor 27 is mounted within the split ring 35, cushioned by a cork gasket 37, and a clamp 38 serves to draw the halves of the split ring together and compress the gasket, thus supporting the motor 27 from the dash 16 independently of the pipes 12 and 14. The clamp 38 comprises two equal semi-circular straps 39 having lateral flanges 40, the ends of which are turned up to prevent rotation of nuts 41 for the clamping screws.

The annular portion 32 is provided with a shoulder 45 against which abuts the end of a sleeve 46 forming part of a spider 47. The sleeve 46 is rigidly secured on the portion 32 as by spot welding, and the spider includes a rim 48 which is similarly secured to the flange 19 of the radiator casing. In this manner the core is supported from the dash independently of the inlet and outlet pipes.

The spider 47 is an important part of the supporting structure, and comprises a plurality of reinforced arms 49 extending from the sleeve 46 to the rim 48, preferably integral with the sleeve and rim. This element may be constructed of a single piece of sheet metal having internal areas thereof cut away between the arms and sleeve and rim. The spider is given a generally conical form, and thus constitutes an open framework about the motor for supporting the radiator core, and at the same time permits access to the motor for convenience in assembly and overhaul.

While the preferred embodiment of the invention has been illustrated and described in such detail as to enable any one skilled in the art to practice the invention, nevertheless it is to be understood that the invention is not to be limited to any of the details disclosed other than as necessitated by the development of the prior art; but instead it is to be understood that the invention embraces such embodiments of the novel idea as fall within the scope of the appended claims, it being obvious that various changes may be made in the disclosed embodiment without departing from the spirit of the invention.

Having thus described my invention I claim:

1. A support for an automobile heater of the type employing a radiator and a motor, said support comprising an attaching member adapted to be bolted to the dash, a spider secured to said attaching member and adapted to support the radiator, and a spider secured to said attaching member and adapted to support the motor.

2. A support for an automobile heater of the type employing a radiator and a motor, said support comprising a casing associated with the radiator, an attaching member adapted to be secured to the dash, a spider connecting said casing and said attaching member, and means carried by said attaching member adapted to support a motor.

3. A support for an automobile heater of the type employing a radiator and a motor, said support comprising a casing adapted to surround the radiator core, said casing having an annular flange thereon, an attaching member adapted to be secured to the dash, said attaching member having an annular projection, a spider mounted on said annular projection and secured to said annular flange, and means carried by said attaching member adapted to support a motor.

4. A support for an automobile heater of the type employing a radiator and a motor, said support comprising a casing associated with the radiator core, an annular flange on said casing, an attaching member adapted to be bolted to the dash, an annular projection on said attaching member, a spider mounted on said annular projection and secured to said annular flange, and means carried by said attaching member adapted to support a motor.

5. A support for an automobile heater of the type employing a radiator and a motor, said support comprising a casing adapted to surround a radiator core, an attaching member adapted to be bolted to a dash, a plurality of spaced diverging supporting arms connecting said casing to said attaching member, an annular slotted projection on said attaching member, and means adapted to secure a motor within said annular slotted projection.

6. A support for an automobile heater of the type employing a radiator and a motor, said support comprising an attaching member adapted to be bolted to the dash, said attaching member having an annular projection slotted longitudinally, and a clamp engaging said slotted projection.

7. A support for an automobile heater of the type employing a radiator and a motor, said support comprising an attaching member adapted to be bolted to a dash, a pair of concentric spiders secured to said attaching member, one of said spiders being adapted to support a radiator, and the other spider being adapted to support a motor.

8. A support for an automobile heater of the type employing a radiator and a motor, said support comprising an attaching member, a pair of spiders associated with said attaching member, one of said spiders being disposed within the other, the outer spider being adapted to support a radiator and the inner spider being adapted to support a motor.

9. In an automobile heater, in combination, a radiator core, inlet and outlet pipes associated with said core, a casing adapted to surround and support said core, a shell associated with said casing and adapted to secure said core in said casing, an annular flange on said casing, an attaching member adapted to be bolted to a dash, an annular projection on said attaching member, a spider mounted on said annular projection and secured to said annular flange, and means carried by said attaching member adapted to support a motor.

10. In an automobile heater in combination, a radiator core, a casing and a shell associated with said core, said core being clamped between said shell and said casing and supported thereby, an attaching member adapted to be bolted to a dash, a plurality of spaced diverging arms connecting said casing with said attaching member, and means carried by said attaching member adapted to support a motor.

11. In an automobile heater of the type employing a radiator and a fan, a casing associated with said core, an annular flange on said casing, said flange surrounding said fan, an attaching member adapted to be bolted to a dash, an annular projection on said attaching member, spaced bars connecting said flange and said projection, a motor arranged within said bars, and an extension on said attaching member adapted to support said motor.

In testimony whereof, I hereunto affix my signature.

GEORGE W. VEALE.

CERTIFICATE OF CORRECTION.

Patent No. 1,882,346.    October 11, 1932.

GEORGE W. VEALE.

It is hereby certified that the name of the assignee in the above numbered patent was erroneously described and specified as "The Eaton Manufacturing Company", whereas said name should have been described and specified as Eaton Manufacturing Company, as shown by the records of assignments in this office; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)

on said casing, an attaching member adapted to be bolted to a dash, an annular projection on said attaching member, a spider mounted on said annular projection and secured to said annular flange, and means carried by said attaching member adapted to support a motor.

10. In an automobile heater in combination, a radiator core, a casing and a shell associated with said core, said core being clamped between said shell and said casing and supported thereby, an attaching member adapted to be bolted to a dash, a plurality of spaced diverging arms connecting said casing with said attaching member, and means carried by said attaching member adapted to support a motor.

11. In an automobile heater of the type employing a radiator and a fan, a casing associated with said core, an annular flange on said casing, said flange surrounding said fan, an attaching member adapted to be bolted to a dash, an annular projection on said attaching member, spaced bars connecting said flange and said projection, a motor arranged within said bars, and an extension on said attaching member adapted to support said motor.

In testimony whereof, I hereunto affix my signature.

GEORGE W. VEALE.

CERTIFICATE OF CORRECTION.

Patent No. 1,882,346.  October 11, 1932.

GEORGE W. VEALE.

It is hereby certified that the name of the assignee in the above numbered patent was erroneously described and specified as "The Eaton Manufacturing Company", whereas said name should have been described and specified as Eaton Manufacturing Company, as shown by the records of assignments in this office; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)

CERTIFICATE OF CORRECTION.

Patent No. 1,882,346. October 11, 1932.

GEORGE W. VEALE.

It is hereby certified that the name of the assignee in the above numbered patent was erroneously described and specified as "The Eaton Manufacturing Company", whereas said name should have been described and specified as Eaton Manufacturing Company, as shown by the records of assignments in this office; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.